United States Patent
Lee et al.

(10) Patent No.: US 11,596,182 B2
(45) Date of Patent: Mar. 7, 2023

(54) METHOD FOR CONTROLLING BATTERY POWER SUPPLIED TO HEATER OF AEROSOL GENERATING APPARATUS, AND AEROSOL GENERATING APPARATUS

(71) Applicant: KT&G CORPORATION, Daejeon (KR)

(72) Inventors: Jae Min Lee, Siheung-si (KR); Young Je Kim, Seoul (KR)

(73) Assignee: KT&G CORPORATION, Daejeon (KR)

( * ) Notice: Subject to any disclaimer, the term of this patent is extended or adjusted under 35 U.S.C. 154(b) by 370 days.

(21) Appl. No.: 16/645,165

(22) PCT Filed: Jul. 24, 2018

(86) PCT No.: PCT/KR2018/008338
§ 371 (c)(1),
(2) Date: Mar. 6, 2020

(87) PCT Pub. No.: WO2019/066228
PCT Pub. Date: Apr. 4, 2019

(65) Prior Publication Data
US 2021/0145073 A1 May 20, 2021

(30) Foreign Application Priority Data

Sep. 26, 2017 (KR) .......................... 10-2017-0124559
Jul. 18, 2018 (KR) .......................... 10-2018-0083652

(51) Int. Cl.
*A24F 40/53* (2020.01)
*A24F 40/57* (2020.01)
(Continued)

(52) U.S. Cl.
CPC .............. *A24F 40/57* (2020.01); *A24F 40/53* (2020.01); *H02J 7/0048* (2020.01);
(Continued)

(58) Field of Classification Search
CPC ........ A24F 40/57; A24F 40/53; H02J 7/0048; H02J 7/007182; H02J 7/0063; H05B 1/0252
See application file for complete search history.

(56) References Cited

U.S. PATENT DOCUMENTS 6,040,560 A * 3/2000 Fleischhauer .......... A61M 11/04
219/494
9,736,887 B2 8/2017 Chiu et al.
(Continued)

FOREIGN PATENT DOCUMENTS

CN 105792688 A 7/2016
CN 106579560 A * 4/2017 ........... A24F 47/008
(Continued)

OTHER PUBLICATIONS

Iwasaki Y, JP-2007309751-A Machine Translation; Nov. 2007 (Year: 2007).*
(Continued)

*Primary Examiner* — Drew A Dunn
*Assistant Examiner* — Pamela J Jeppson
(74) *Attorney, Agent, or Firm* — Sughrue Mion, PLLC (57) ABSTRACT

An aerosol generation device includes a heater configured to generate an aerosol by heating an aerosol generating substrate; and a controller configured to control power to be supplied to the heater by a battery using a control signal, wherein the controller is further configured to identify state information of the battery at a heating start time point when the heater starts to be heated and calculate a duty ratio of the control signal based on the identified state information.

19 Claims, 9 Drawing Sheets

(51) Int. Cl.
*H02J 7/00* (2006.01)
*H05B 1/02* (2006.01)

(52) U.S. Cl.
CPC ...... *H02J 7/0063* (2013.01); *H02J 7/007182* (2020.01); *H05B 1/0252* (2013.01)

(56) References Cited

U.S. PATENT DOCUMENTS

| | | | |
|---|---|---|---|
| 9,814,263 | B2 | 11/2017 | Cochand et al. |
| 10,201,186 | B2 | 2/2019 | Alarcon et al. |
| 10,492,533 | B2 | 12/2019 | Bernauer et al. |
| 10,757,972 | B2 | 9/2020 | Matsumoto et al. |
| 11,013,872 | B2 | 5/2021 | Silvestrini et al. |
| 2001/0013767 | A1* | 8/2001 | Takemoto ............. H02J 7/0013 320/132 |
| 2014/0251324 | A1 | 9/2014 | Xiang |
| 2016/0057811 | A1 | 2/2016 | Alarcon et al. |
| 2016/0374397 | A1 | 12/2016 | Jordan et al. |
| 2017/0027234 | A1 | 2/2017 | Farine et al. |
| 2018/0176990 | A1* | 6/2018 | Ouyang ................. A24F 40/50 |
| 2019/0387792 | A1* | 12/2019 | Qiu ........................ A24F 40/53 |

FOREIGN PATENT DOCUMENTS

| | | | |
|---|---|---|---|
| CN | 106579560 | A | 4/2017 |
| CN | 106998808 | A | 8/2017 |
| EP | 3 207 811 | B1 | 2/2020 |
| JP | 2007309751 | A * | 11/2007 ............ G01N 27/12 |
| KR | 1020130130759 | A | 12/2013 |
| KR | 1020160147256 | A | 12/2016 |
| KR | 1020170066337 | A | 6/2017 |
| KR | 10-2017-0076768 | A | 7/2017 |
| WO | 2016/075747 | A1 | 5/2016 |
| WO | 2016/172921 | A1 | 11/2016 |
| WO | 2017033007 | A1 | 3/2017 |

OTHER PUBLICATIONS

Notice of Non-Final Rejection dated Dec. 19, 2019 from the Korean Intellectual Property Office in application No. 10-2018-0083652.
International Search Report dated Oct. 29, 2018 from the International Bureau in application No. PCT/KR2018/008338.
Communication dated Feb. 9, 2021 in Japanese Application No. 2020-500904.
Extended European Search Report dated May 31, 2021 in Application No. 18860141.3.
Office Action dated Sep. 8, 2022 in Chinese Application No. 201880047320.9.

* cited by examiner

METHOD FOR CONTROLLING BATTERY POWER SUPPLIED TO HEATER OF AEROSOL GENERATING APPARATUS, AND AEROSOL GENERATING APPARATUS

TECHNICAL FIELD

The present disclosure relates to a method of controlling power of a battery supplied to a heater of an aerosol generation device and the aerosol generation device, and more particularly, to a method of controlling power of a heater included in an aerosol generation device according to state information of a battery and the aerosol generation device for implementing the method.

BACKGROUND ART

Recently, there is a growing demand for alternative methods of resolving problems of common cigarettes. For example, there is a growing demand for a method of generating aerosol by heating an aerosol generating material in a cigarette instead of burning the cigarette to generate aerosol. Therefore, research into heating-type cigarettes or heating-type aerosol generation devices is being actively carried out.

The aerosol generation device may include a heater for generating an aerosol by generally heating an aerosol generating substrate and a separate main controller unit (MCU) to control power supplied to the heater. The heater of the aerosol generation device has a characteristic of being heated by power supplied by a battery and preheated until reaching a target temperature sufficient to heat the aerosol generating substrate. In general, a preheating time changes according to the power supplied to the heater, and when the voltage level of the battery changes, the power that the battery may supply to the heater also changes, and thus the preheating time of the heater is not constant. When the preheating time of the heater is not constant, not only does the waiting time of a user who wants to inhale the aerosol through the aerosol generation device change every time, but also a thermal energy received by the aerosol generating substrate (a cigarette or liquid) is not constant, which causes a problem in that the smoking satisfaction of the user changes every time.

DETAILED DESCRIPTION

Technical Problem

Provided are a method of ensuring a uniform preheating time of a heater regardless of a state of a battery and an aerosol generation device for implementing the method.

Solution to Problem

According to an aspect of the present disclosure, an aerosol generation device may include a heater configured to generate an aerosol by heating an aerosol generating substrate; and a controller configured to control power supplied to the heater by a battery using a control signal, wherein the controller is further configured to identify state information of the battery at a heating start time point when the heater starts to be heated and calculate a duty ratio of the control signal based on the identified state information.

According to another aspect of the present disclosure, a method of controlling power of a battery supplied to a heater includes identifying state information of the battery at a heating start time point when the heater starts to be heated and calculating a duty ratio of the control signal based on the identified state information.

According to another aspect of the present disclosure, a computer-readable recording medium storing a program for implementing the method is provided.

Advantageous Effects

According to an aerosol generation device of the present disclosure, the preheating time of a heater may be ensured to be uniform regardless of a state or a type of a battery.

BEST MODE

According to an aspect of the present disclosure, an aerosol generation device may include a heater configured to generate an aerosol by heating an aerosol generating substrate; and a controller configured to control power supplied to the heater by a battery using a control signal, wherein the controller is further configured to identify state information of the battery at a heating start time point when the heater starts to be heated and calculate a duty ratio of the control signal based on the identified state information.

According to another aspect of the present disclosure, a method of controlling power of a battery supplied to a heater includes identifying state information of the battery at a heating start time point when the heater starts to be heated and calculating a duty ratio of the control signal based on the identified state information.

According to another aspect of the present disclosure, a computer-readable recording medium storing a program for implementing the method is provided.

MODE OF DISCLOSURE

As the present disclosure allows for various changes and numerous embodiments, particular embodiments will be illustrated in the drawings and described in detail in the written description. The accompanying drawings for illustrating the present disclosure are referred to in order to gain a sufficient understanding, the merits thereof, and the objectives accomplished by the implementation. However, the present disclosure may have different forms and should not be construed as being limited to the descriptions set forth herein.

The embodiments of the present disclosure will be described below in more detail with reference to the accompanying drawings. Those elements that are the same or are in correspondence are rendered the same reference numeral regardless of the figure number, and redundant explanations are omitted.

While such terms as "first," "second," etc., may be used to describe various elements, such elements must not be limited to the above terms. The above terms are used only to distinguish one element from another.

An expression used in the singular encompasses the expression of the plural, unless it has a clearly different meaning in the context.

In the present disclosure, it is to be understood that the terms such as "including," "having," and "comprising" are intended to indicate the existence of the features or elements disclosed in the disclosure, and are not intended to preclude the possibility that one or more other features or elements may exist or may be added.

When a certain embodiment may be implemented differently, a specific process order may be performed differently from the described order. For example, two consecutively described processes may be performed substantially at the same time or performed in an order opposite to the described order.

Hereinafter, embodiments of the present disclosure will be described in detail with reference to the drawings.

Figure 1:
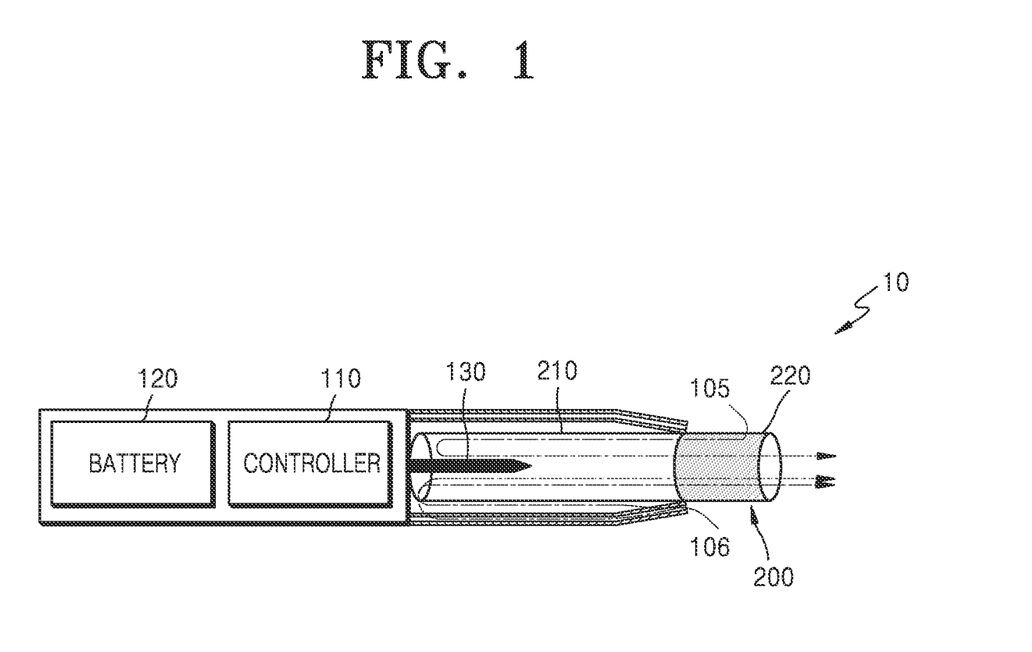
FIGS. 1 through 3 are diagrams showing examples in which a cigarette is inserted into an aerosol generating device.
Figure 2:
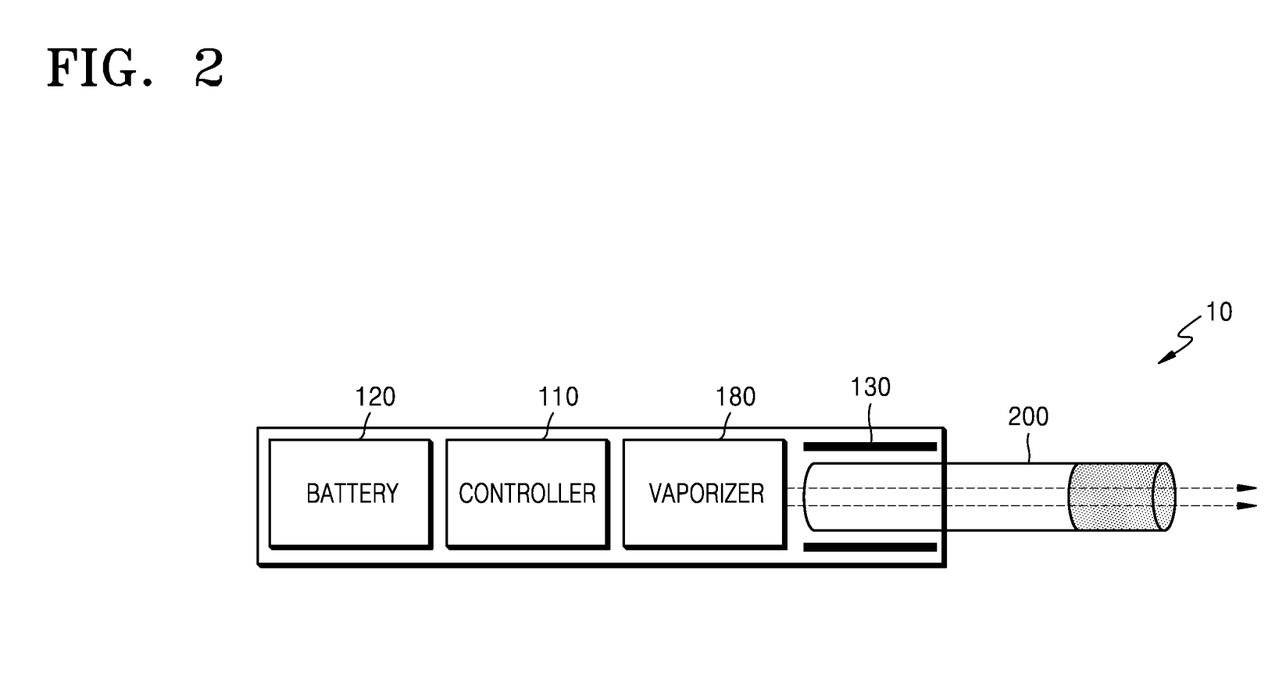
Figure 3:
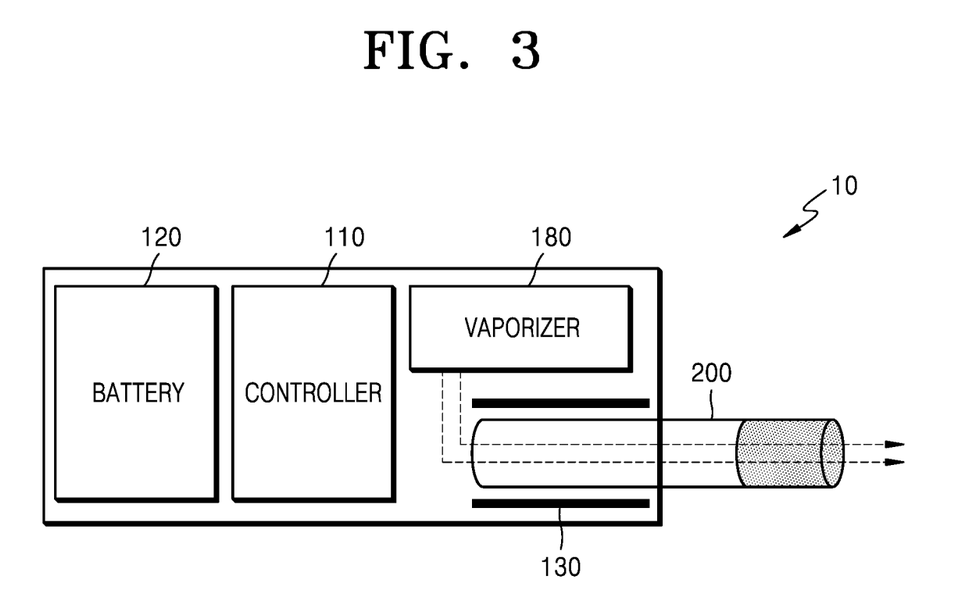

FIGS. 1 through 3 are diagrams showing examples in which a cigarette is inserted into an aerosol generating device.

Referring to FIG. 1, the aerosol generating device 10 may include a battery 120, a controller 110, and a heater 130. Referring to FIGS. 2 and 3, the aerosol generating device 10 may further include a vaporizer 180. Also, a cigarette 200 may be inserted into an inner space of the aerosol generating device 10.

FIGS. 1 through 3 illustrate components of the aerosol generating device 10, which are related to the present embodiment. Therefore, it will be understood by one of ordinary skill in the art related to the present embodiment that other general-purpose components may be further included in the aerosol generating device 10, in addition to the components illustrated in FIGS. 1 through 3.

Also, FIGS. 2 and 3 illustrate that the aerosol generating device 10 includes the heater 130. However, according to necessity, the heater 130 may be omitted.

FIG. 1 illustrates that the battery 120, the controller 110, and the heater 130 are arranged in series. Also, FIG. 2 illustrates that the battery 120, the controller 110, the vaporizer 180, and the heater 130 are arranged in series. Also, FIG. 3 illustrates that the vaporizer 180 and the heater 130 are arranged in parallel. However, the internal structure of the aerosol generating device 10 is not limited to the structures illustrated in FIGS. 1 through 3. In other words, according to the design of the aerosol generating device 10, the battery 120, the controller 110, the heater 130, and the vaporizer 180 may be differently arranged.

When the cigarette 200 is inserted into the aerosol generating device 10, the aerosol generating device 10 may operate the heater 130 and/or the vaporizer 180 to generate an aerosol from the cigarette 200 and/or the vaporizer 180. The aerosol generated by the heater 130 and/or the vaporizer 180 is delivered to a user by passing through the cigarette 200.

According to necessity, even when the cigarette 200 is not inserted into the aerosol generating device 10, the aerosol generating device 10 may heat the heater 130.

The battery 120 may supply power to be used for the aerosol generating device 10 to operate. For example, the battery 120 may supply power to heat the heater 130 or the vaporizer 180, and may supply power for operating the controller 110. Also, the battery 120 may supply power for operations of a display, a sensor, a motor, etc. mounted in the aerosol generating device 10.

The controller 110 may generally control operations of the aerosol generating device 10. Specifically, the controller 110 may control not only operations of the battery 120, the heater 130, and the vaporizer 180, but also operations of other components included in the aerosol generating device 10. Also, the controller 110 may check a state of each of the components of the aerosol generating device 10 to determine whether or not the aerosol generating device 10 is able to operate.

The controller 110 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 130 may be heated by the power supplied from the battery 120. For example, when the cigarette 200 is inserted into the aerosol generating device 10, the heater 130 may be located outside the cigarette 200. Thus, the heated heater 130 may increase a temperature of an aerosol generating material in the cigarette 200.

The heater 130 may include an electro-resistive heater. For example, the heater 130 may include an electrically conductive track, and the heater 130 may be heated when currents flow through the electrically conductive track. However, the heater 130 is not limited to the example described above and may include all heaters which may be heated to a desired temperature. Here, the desired temperature may be pre-set in the aerosol generating device 10 or may be set as a temperature desired by a user.

As another example, the heater 130 may include an induction heater. Specifically, the heater 130 may include an electrically conductive coil for heating a cigarette in an induction heating method, and the cigarette may include a susceptor which may be heated by the induction heater.

For example, the heater 130 may include a tube-type heating element, a plate-type heating element, a needle-type heating element, or a rod-type heating element, and may heat the inside or the outside of the cigarette 200, according to the shape of the heating element.

Also, the aerosol generating device 10 may include a plurality of heaters 130. Here, the plurality of heaters 130 may be inserted into the cigarette 200 or may be arranged outside the cigarette 200. Also, some of the plurality of heaters 130 may be inserted into the cigarette 200 and the others may be arranged outside the cigarette 200. In addition, the shape of the heater 130 is not limited to the shapes illustrated in FIGS. 1 through 3 and may include various shapes.

The vaporizer 180 may generate an aerosol by heating a liquid composition and the generated aerosol may pass through the cigarette 200 to be delivered to a user. In other words, the aerosol generated via the vaporizer 180 may move along an air flow passage of the aerosol generating device 10 and the air flow passage may be configured such that the aerosol generated via the vaporizer 180 passes through the cigarette 200 to be delivered to the user.

For example, the vaporizer 180 may include a liquid storage, a liquid delivery element, and a heating element, but it is not limited thereto. For example, the liquid storage, the liquid delivery element, and the heating element may be included in the aerosol generating device 10 as independent modules.

The liquid storage may store a liquid composition. For example, the liquid composition may be a liquid including a tobacco-containing material having a volatile tobacco flavor component, or a liquid including a non-tobacco material. The liquid storage may be formed to be attached/detached to/from the vaporizer 180 or may be formed integrally with the vaporizer 180.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 180 may be referred to as a cartomizer or an atomizer, but it is not limited thereto.

The aerosol generating device 10 may further include general-purpose components in addition to the battery 120, the controller 110, the heater 130, and the vaporizer 180. For example, the aerosol generating device 10 may include a display capable of outputting visual information and/or a motor for outputting haptic information. Also, the aerosol generating device 10 may include at least one sensor (a puff detecting sensor, a temperature detecting sensor, a cigarette insertion detecting sensor, etc.). Also, the aerosol generating device 10 may be formed as a structure where, even when the cigarette 200 is inserted into the aerosol generating device 10, external air 105 may be introduced or internal air may be discharged.

Although not illustrated in FIGS. 1 through 3, the aerosol generating device 10 and an additional cradle may form together a system. For example, the cradle may be used to charge the battery 120 of the aerosol generating device 10. Alternatively, the heater 130 may be heated when the cradle and the aerosol generating device 10 are coupled to each other.

The cigarette 200 may be similar as a general combustive cigarette. For example, the cigarette 200 may be divided into a first portion including an aerosol generating material and a second portion including a filter, etc. Alternatively, the second portion of the cigarette 200 may also include an aerosol generating material. For example, an aerosol generating material made in the form of granules or capsules may be inserted into the second portion.

The entire first portion may be inserted into the aerosol generating device 10, and the second portion may be exposed to the outside. Alternatively, only a portion of the first portion may be inserted into the aerosol generating device 10, or the entire first portion and a portion of the second portion may be inserted into the aerosol generating device 10. The user may puff aerosol while holding the second portion by the mouth of the user. In this case, the aerosol is generated by the external air passing through the first portion, and the generated aerosol passes through the second portion and is delivered to the user's mouth.

For example, the external air 106 may flow into at least one air passage formed in the aerosol generating device 10. For example, the opening and closing and/or a size of the air passage formed in the aerosol generating device 10 may be adjusted by the user. Accordingly, the amount of smoke and a smoking impression may be adjusted by the user. As another example, the external air may flow into the cigarette 200 through at least one hole formed in a surface of the cigarette 200.

Hereinafter, an example of the cigarette 200 will be described with reference to FIG. 4.

Figure 4:
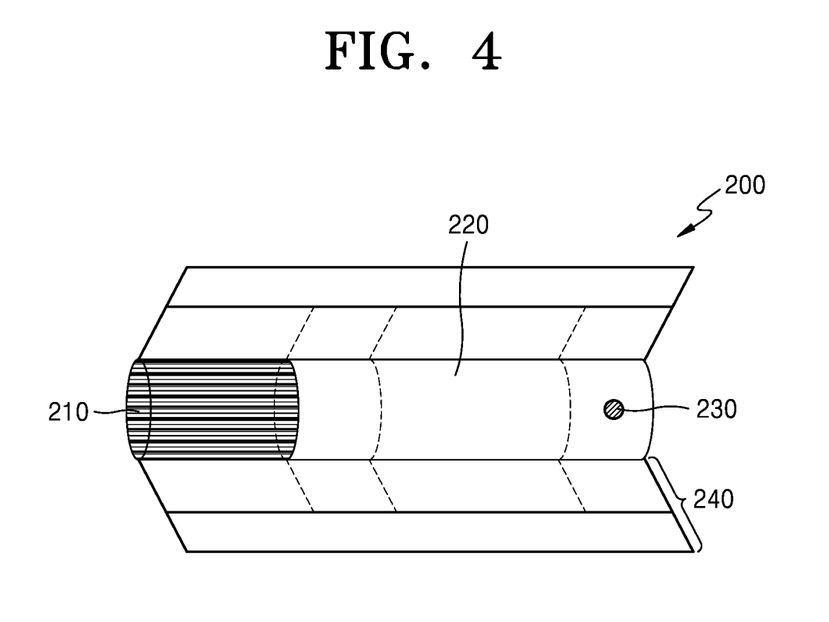
FIG. 4 illustrates an example of a cigarette.

FIG. 4 illustrates an example of a cigarette.

Referring to FIG. 4, the cigarette 200 may include a tobacco rod 210 and a filter rod 220. The first portion of the cigarette 200 described above with reference to FIGS. 1 through 3 may include the tobacco rod 210, and the second portion of the cigarette 200 may include the filter rod 220.

FIG. 4 illustrates that the filter rod 220 includes a single segment. However, the filter rod 220 is not limited thereto. In other words, the filter rod 220 may include a plurality of segments. For example, the filter rod 220 may include a first segment configured to cool an aerosol and a second segment configured to filter a certain component included in the aerosol. Also, according to necessity, the filter rod 220 may further include at least one segment configured to perform other functions.

The cigarette 200 may be packaged via at least one wrapper 240. The wrapper 240 may have at least one hole through which external air may be introduced or internal air may be discharged. For example, the cigarette 200 may be packaged via one wrapper 240. As another example, the cigarette 200 may be double-packaged via at least two wrappers 240. For example, the tobacco rod 210 may be packaged via a first wrapper, and the filter rod 220 may be packaged via a second wrapper. Also, the tobacco rod 210 and the filter rod 220, which are respectively packaged via separate wrappers, may be coupled to each other, and the entire cigarette 200 may be packaged via a third wrapper. When each of the tobacco rod 210 and the filter rod 220 includes a plurality of segments, each segment may be packaged via a separate wrapper. Also, the entire cigarette 200 including the plurality of segments, which are respectively packaged via the separate wrappers and which are coupled to each other, may be re-packaged via another wrapper.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 210 may include other additives, such as flavors, a wetting agent, and/or organic acid. Also, the tobacco rod 210 may include a flavored liquid, such as menthol or a moisturizer, which is injected to the tobacco rod 210.

The tobacco rod 210 may be manufactured in various forms. For example, the tobacco rod 210 may be formed as a sheet or a strand. Also, the tobacco rod 210 may be formed as a pipe tobacco, which is formed of tiny bits cut from a tobacco sheet. Also, the tobacco rod 210 may be surrounded by a heat conductive material. For example, the heat-conducting material may be, but is not limited to, a metal foil such as aluminum foil. For example, the heat conductive material surrounding the tobacco rod 210 may uniformly distribute heat transmitted to the tobacco rod 210, and thus, the heat conductivity applied to the tobacco rod may be increased and taste of the tobacco may be improved. Also, the heat conductive material surrounding the tobacco rod 210 may function as a susceptor heated by the induction heater. Here, although not illustrated in the drawings, the tobacco rod 210 may further include an additional susceptor, in addition to the heat conductive material surrounding the tobacco rod 210.

The filter rod 220 may include a cellulose acetate filter. Also, shapes of the filter rod 220 are not limited. For example, the filter rod 220 may include a cylinder-type rod or a tube-type rod having a hollow inside. Also, the filter rod 220 may include a recess-type rod. When the filter rod 220 includes a plurality of segments, at least one of the plurality of segments may have a different shape.

The filter rod 220 may be formed to generate flavors. For example, a flavoring liquid may be injected onto the filter rod 220, or an additional fiber coated with a flavoring liquid may be inserted into the filter rod 220.

Also, the filter rod 220 may include at least one capsule 230. Here, the capsule 230 may generate a flavor or an aerosol. For example, the capsule 230 may have a configuration in which a liquid containing a flavoring material is wrapped with a film. For example, the capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Although not illustrated in FIG. 4, the cigarette 200 according to an embodiment may further include a front-end filter. The front-end filter may be located on a side of the tobacco rod 210, the side facing the filter rod 220. The front-end filter may prevent the tobacco rod 210 from being detached outwards and prevent a liquefied aerosol from flowing into the aerosol generating device 10 (FIGS. 1 through 3) from the tobacco rod 210, during smoking.

Figure 5:
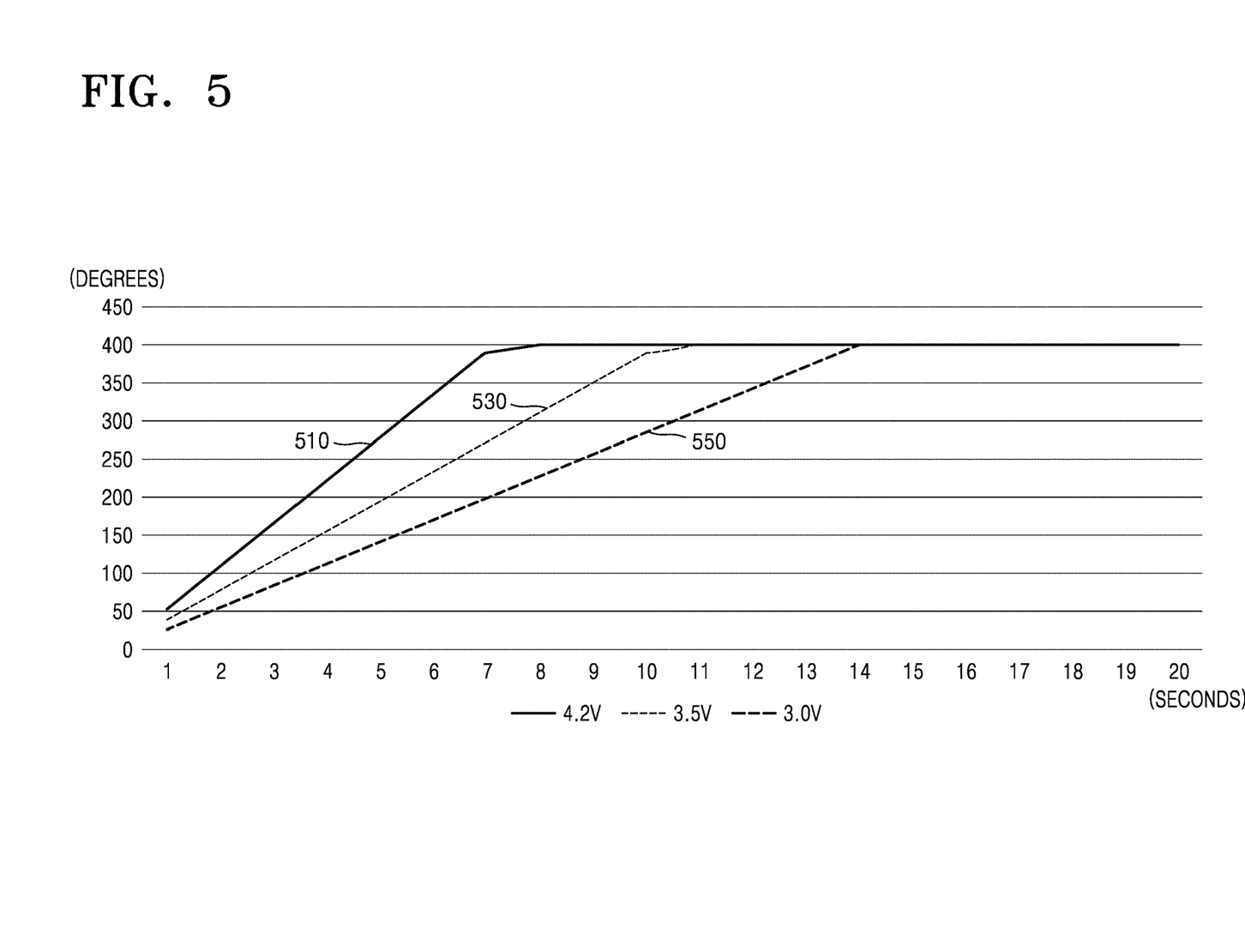
FIG. 5 is a diagram illustrating a temperature curve of a heater for each voltage of a battery when the heater is preheated at a fixed pulse width modulation (PWM) duty ratio.

FIG. 5 is a diagram illustrating a temperature curve of a heater for each voltage of a battery when the heater is preheated at a fixed pulse width modulation (PWM) duty.

Referring to FIG. 5, the heater exhibits different preheating patterns for each of the voltage levels of the battery at 4.2V, 3.5V and 3.0V. First, referring to a preheating curve 510, when the initial voltage of the battery is 4.2V, according to the fixed PWM duty, power supplied to the heater is determined to be relatively high such that, after about 7 seconds have elapsed since the start of preheating, the temperature of the heater reaches a target temperature of 400 degrees. Subsequently, referring to a preheating curve 530, when the initial voltage of the battery is 3.5V, after about 10 seconds have elapsed since the start of preheating, the temperature of the heater reaches the target temperature of 400 degrees, and referring to a preheating curve 550, when the initial voltage of the battery is 3.0V, after about 14 seconds have elapsed since the start of preheating, the temperature of the heater reaches the target temperature of 400 degrees.

When the power is supplied to the heater through a control signal using the fixed PWM duty regardless of the voltage level of the battery as shown in FIG. 5, a difference occurs in the preheating time and the temperature rising inclination according to the voltage level of the battery. Because the difference in the preheating time causes a difference in a thermal energy received by an aerosol generating substrate, it is impossible to provide a consistent smoking experience to the user, and thus the present disclosure intends to solve the above problem by controlling the power based on the state information of the battery.

Figure 6:
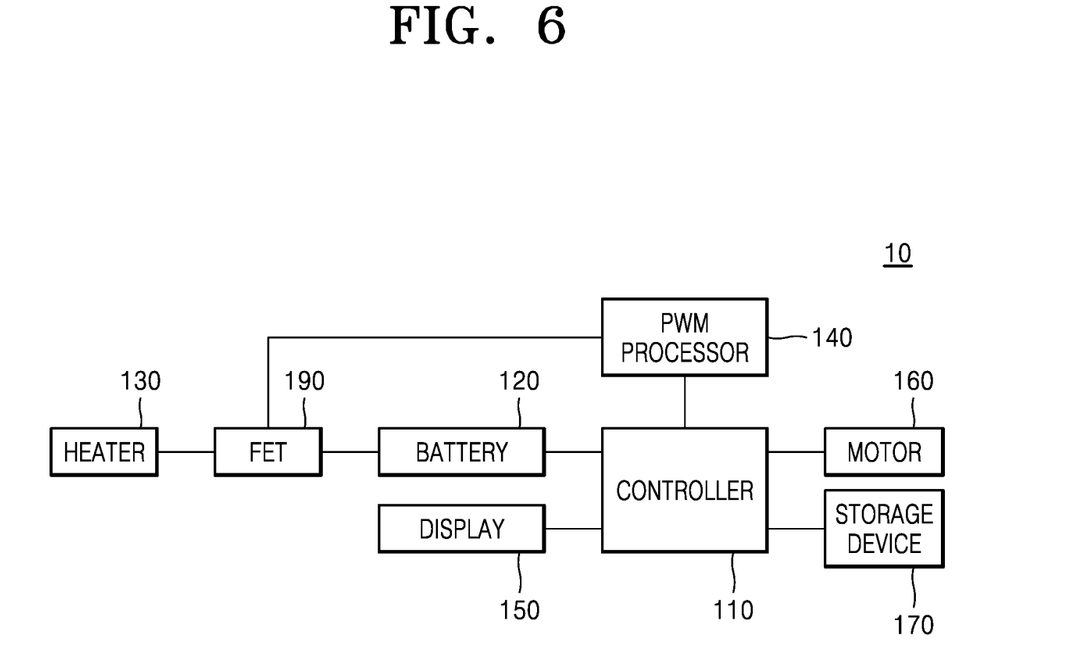
FIG. 6 is a diagram schematically showing a block diagram of an example of an aerosol generation device.

FIG. 6 is a diagram schematically showing a block diagram of an example of an aerosol generation device 10.

Referring to FIG. 6, the aerosol generation device 10 according to the present disclosure may include the controller 110, the battery 120, the heater 130, a PWM processor 140, a display 150, a motor 160, a storage device 170 and a field effect transistor (FET) 190.

The controller 110 may collectively control the battery 120, the heater 130, the PWM processor 140, the display 150, the motor 160, the storage device 170, and the FET 190 included in the aerosol generation device 10. Although not shown in FIG. 6, according to an embodiment, the controller 110 may further include an input receiver (not shown) that receives a button input or a touch input of a user and a communicator (not shown) that communicates with an external communication device such as a user terminal.

The battery 120 may supply power to the heater 130, and the magnitude of the power supplied to the heater 130 may be adjusted by a control signal output from the controller 110.

The heater 130 may generate heat by an intrinsic resistance when a current is applied. When an aerosol generating substrate contacts (couples) the heated heater 130, an aerosol that may be inhaled by the user may be generated.

The PWM processor 140 may allow the controller 110 to control the power supplied to the heater 130 through a method of transmitting a PWM signal to the heater 130. According to an embodiment, the PWM processor 140 may be implemented in a manner in which the PWM processor 140 is included in the controller 110.

The display 150 may visually output various alarm messages generated by the aerosol generation device 10 such that a user who uses the aerosol generation device 10 may confirm the alarm messages. The user may confirm a battery power shortage message or an overheat warning message of the heater 130 output on the display 150 and take appropriate measures before an operation of the aerosol generation device 10 stops or the aerosol generation device 10 is damaged.

The motor 160 may be driven by the controller 110 to allow the user to perceive through the tactile sense that the aerosol generation device 10 is ready for use.

The storage device 170 may store various information for the controller 110 to appropriately control the power supplied to the heater 130 and to provide various flavors to the user who uses the aerosol generation device 10. The storage device 170 may not only be configured as a nonvolatile memory like a flash memory, but also as a volatile memory that temporarily stores data only when electrically connected in order to secure a faster data input/output (I/O) speed.

The FET 190 receives the control signal from the controller 110 and repeats an on-off operation to adjust the power provided to the heater 130. According to an embodiment, the FET 190 may be omitted from the aerosol generation device 10. When the FET 190 is omitted, a signal output from the controller 110 or the PWM processor 140 is directly transmitted to the heater 130. A detailed operation of the FET 190 will be described later with reference to FIGS. 7 through 11.

Figure 7:
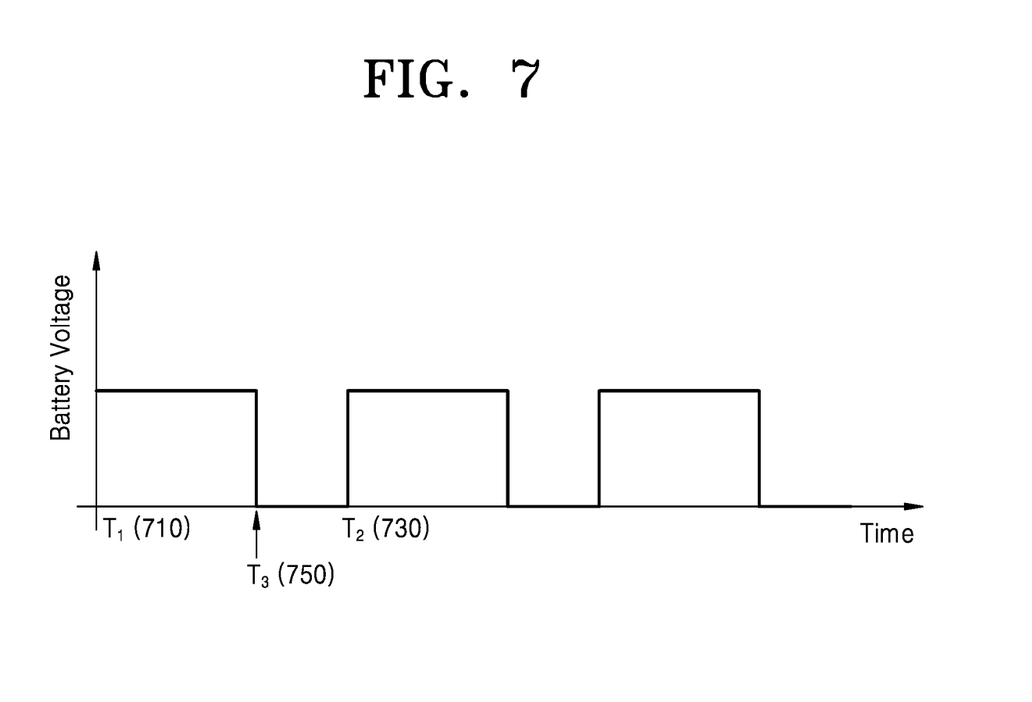
FIG. 7 is a diagram for explaining a control signal output from a controller.

FIG. 7 is a diagram for explaining a control signal output from the controller 110.

Referring to FIG. 7, a PWM signal for driving power applied to a battery by the controller 110 has a constant duty ratio D. Hereinafter, referring to FIGS. 5 and 6, an operation process of an aerosol generation device that controls power supplied to a heater based on the voltage level of the battery 120 according to the present disclosure will be described in detail.

$$V_{eff} = V_{rms} = \sqrt{\frac{1}{T_2 - T_1} \int_{T_1}^{T_2} [(V(t)]^2 dt} = \frac{V_B}{10}\sqrt{D} \qquad \text{[Equation 1]}$$

Equation 1 defines an effective voltage $V_{eff}$ of the battery 120. In Equation 1, $V_B$ denotes a battery voltage, and $T_1$ and $T_2$ denote specific time points which are different from each other on the time axis. As shown in Equation 1, the effective voltage $V_{eff}$ between $T_1$ and $T_2$ may be maintained constantly by adjusting the duty ratio D even when the battery voltage $V_B$ drops.

$$D(\%) = \frac{T_3 - T_2}{T_2 - T_1} \times 100 \qquad \text{[Equation 2]}$$

Equation 2 defines the duty ratio D. The duty ratio D refers to a ratio of the time that a current flows in a specific device or module with respect to a sum of the time that the current flows and the time that no current flows when the current is supplied to the device or the module in the form of a periodic pulse. According to an embodiment, the duty ratio D may be defined for the voltage as well as the current. In Equation 2, $T_1$ 710 denotes a time point when a control signal for controlling the heater 130 is transmitted to the heater 130, $T_2$ 730 denotes a time point when one cycle of the control signal ends, and $T_3$ 750 denotes a time point when the current (voltage) in the control signal of the form of pulse is supplied to the heater 130 and then cut off. The control signal is generated to keep the battery voltage $V_B$ constant for a predetermined period T2-T1.

$$P = \frac{V_{eff}^2}{R_H} = \frac{V_B^2}{R_H} \times \frac{D}{100} \qquad \text{[Equation 3]}$$

Equation 3 defines power supplied by the battery 120. In Equation 3, $R_H$ denotes a resistance value of the heater 130. As shown in Equation 3, the power supplied to the heater 130 depends on the duty ratio D of the voltage $V_B$ of the battery 120, the resistance of the battery 120, and the power transfer signal (the control signal) applied to the heater 130, and thus, even if the voltage $V_B$ of the battery 120 decreases, the power may be maintained at a constant value by increasing the duty ratio D.

$$D = \frac{100 P R_H}{V_B^2} \qquad \text{[Equation 4]}$$

Equation 4 summarizes Equation 3 with respect to the duty ratio D. As shown in Equation 4, the duty ratio D of the power transfer signal applied to the heater 130 is proportional to the power applied to the heater 130 and the resistance value of the heater 130, and is inversely proportional to the square of the voltage $V_B$ of the battery 120.

$$D = K_P \frac{V_{min}^2 PWM_{max}}{V_C^2} \qquad \text{[Equation 5]}$$

Equation 5 is another example of the duty ratio D described in Equation 4. In Equation 5, $K_P$ denotes a proportional constant, $V_{min}$ denotes a minimum value of the voltage used by the battery 120, $PWM_{max}$ denotes a maximum value of the PWM duty, and $V_C$ denotes a voltage level of the battery 120 at the present time point.

First, the proportional constant $K_P$ is an experimentally determined constant value, and is defined as a number that adjusts the duty ratio D to have a value in a predetermined range. $V_{min}$ denotes the minimum value of the voltage used by the battery 120 and denotes a preset voltage value according to a unique design characteristic of each battery 120 or the equivalent impedance of the entire module receiving power from the battery 120 in the aerosol generation device 10. The battery 120 may output at least one voltage as much as $V_{min}$ as an output voltage. $PWM_{max}$ denotes the maximum value of the PWM duty, and may be arbitrarily selected from values between 0.9 and 1. $V_C$ denotes the voltage level of the battery 120 at the present time point. In this regard, the present time point may be various time points other than the time point when the heater 130 starts to be heated.

Equation 5 is a formula that further generalizes Equation 4 to highlight the effect of the present disclosure, and the controller 110 included in the aerosol generation device 10 according to the present disclosure calculates the duty ratio D of the control signal through Equation 5 and transfers the control signal according to the calculated duty ratio D to the heater 130, and thus according to the present disclosure, a constant preheating time may be ensured at all times regardless of a state of the battery 120. As shown in Equation 4, even when the resistance value $R_H$ of the heater 130 or the battery voltage $V_B$ changes, the power supplied to the heater 130 may be maintained constant by adjusting the duty ratio D.

The controller 110 may identify the state information of the battery 120 at the time point when the heater 130 starts to be heated, and calculate the duty ratio D of the control signal based on the identified state information. Here, the duty ratio D of the control signal calculated by the controller 110 refers to the duty ratio D calculated by Equation 5, and the state information of the battery 120 is a concept encompassing information used to identify the state of the battery 120 output from the battery 120 when the time point is fixed, and may include all of the voltage values of the battery 120, the maximum storage capacity when the battery 120 was produced, the remaining capacity of the battery 120, the intrinsic identification information of the battery 120 itself or information directly related to battery life.

As an example, the controller 110 may calculate the duty ratio D of the control signal based on the voltage value of the battery 120 extracted from the state information of the battery 120. The voltage value of the battery 120 at this time means a voltage value at the time point when the heater 130 starts to be heated by the power supplied by the battery 120.

As another example, the controller 110 may calculate the duty ratio D of the control signal based on the minimum value $V_{min}$ of the voltage used by the battery 120 that is preset according to the equivalent impedance of the entire module receiving power from the battery 120. Here, the minimum value $V_{min}$ of the voltage used by the battery 120 in Equation 5 is the intrinsic value determined according to the design of the aerosol generation device 10 or the battery 120 and may be obtained from the battery 120 or the storage device 170.

As another example, the controller 110 may analyze the state information of the battery 120 to estimate the remaining capacity of the battery 120 and calculate the duty ratio D based on the estimated remaining capacity. In this case, the controller 110 may estimate the remaining capacity of the battery 120 using the voltage value of the battery 120 at the present time point. As a method of estimating the remaining capacity of the battery 120 using the voltage value of the battery 120, a well-known method as described in JP-A-2003-307557 may be adopted.

As another example, the aerosol generation device 10 according to the present disclosure may also include the FET 190 that performs an on-off operation according to the duty ratio D when the controller 110 calculates the duty ratio D of the control signal and to allow the power of the battery 120 to be supplied to the heater 130. More specifically, when the PWM processor 140 receives the control signal of the controller 110 and inputs the PWM signal that changes the duty value by modulating a pulse width of the control signal to the FET 190, the FET 190 supplies the power to the heater 130 according to the duty value of the PWM signal through a process of repeatedly performing the on-off operation. At this time, the duty value is a value for supplying a constant power to the heater 130 regardless of the state information of the battery 120 and may be calculated using Equation 5.

As an alternative embodiment, the controller 110 may control power to be supplied to the heater 130 by using a control signal according to a first duty ratio at the heating start time point, and, when the state information of the battery 120 changes exceeding a preset range before the temperature of the heater 130 reaches a target temperature, the controller 110 may calculate a second duty ratio at a time point of the change and control the power to be supplied to the heater 130 by using a control signal according to the second duty ratio. In the present alternative embodiment, the controller 110 may monitor not only the temperature of the heater 130, but also the voltage level of the battery 120 in real time, and when the voltage level of the battery 120 falls exceeding a preset range before the temperature of the heater 130 reaches the target temperature, the controller 130 may increase the duty ratio by a predetermined value in real time such that the power supplied to the heater 130 does not fall.

Here, the first duty ratio is calculated according to the voltage level of the battery 120 at the heating start time point when the heater 130 starts to be heated, and the second duty ratio is calculated according to the voltage level of the battery 120 at the time when the voltage level of the battery 120 rapidly falls before the temperature of the heater 130 reaches the target temperature.

The battery voltage has a characteristic in which the voltage level gradually decreases according to the discharged capacitance and rapidly falls while the battery 120 is rapidly discharged at a specific time point. Accordingly, as described with Equation 5, because the voltage level of the battery 120 drops, a voltage applied from the battery 120 to the heater 130 also tends to gradually decrease, and the controller 110 may determine that the state information of the battery 120 has changed exceeding the preset range when the voltage level of the battery 120 rapidly falls and may increase the duty ratio D of the control signal, thereby controlling the power supplied to the heater 130 to be constantly maintained.

Figure 8:
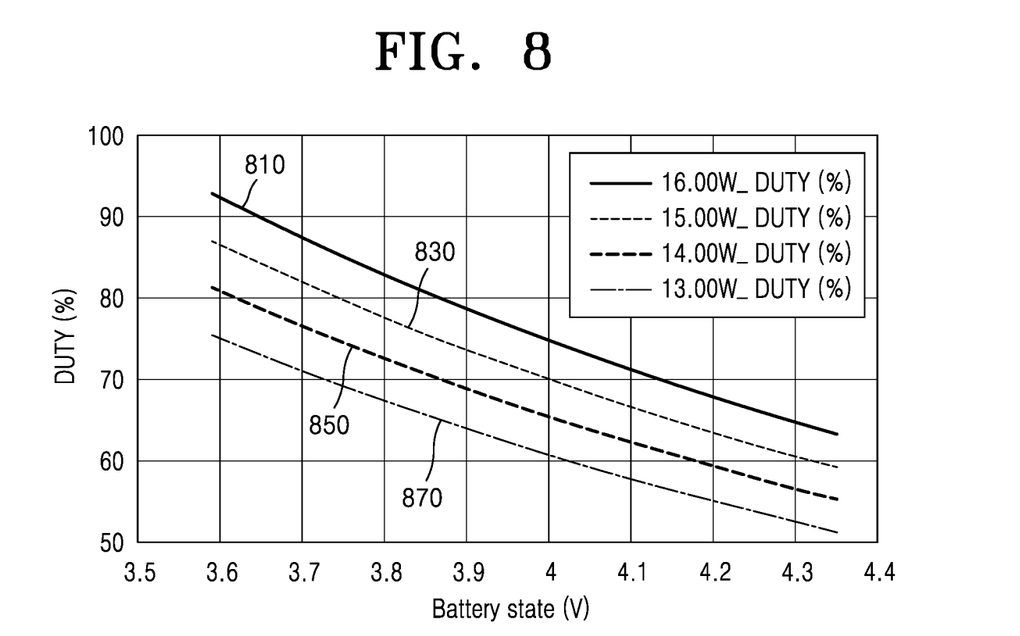
FIG. 8 is a diagram for explaining a relationship between a battery voltage and a duty ratio according to a power value.

FIG. 8 is a diagram for explaining a relationship between a battery voltage and a duty ratio according to a power value.

Referring to FIG. 8, the voltage level of the battery 120 and the duty ratio vary according to the power supplied to the heater 130. More specifically, the duty ratio of a control signal increases as the supply power value increases.

Figure 9:
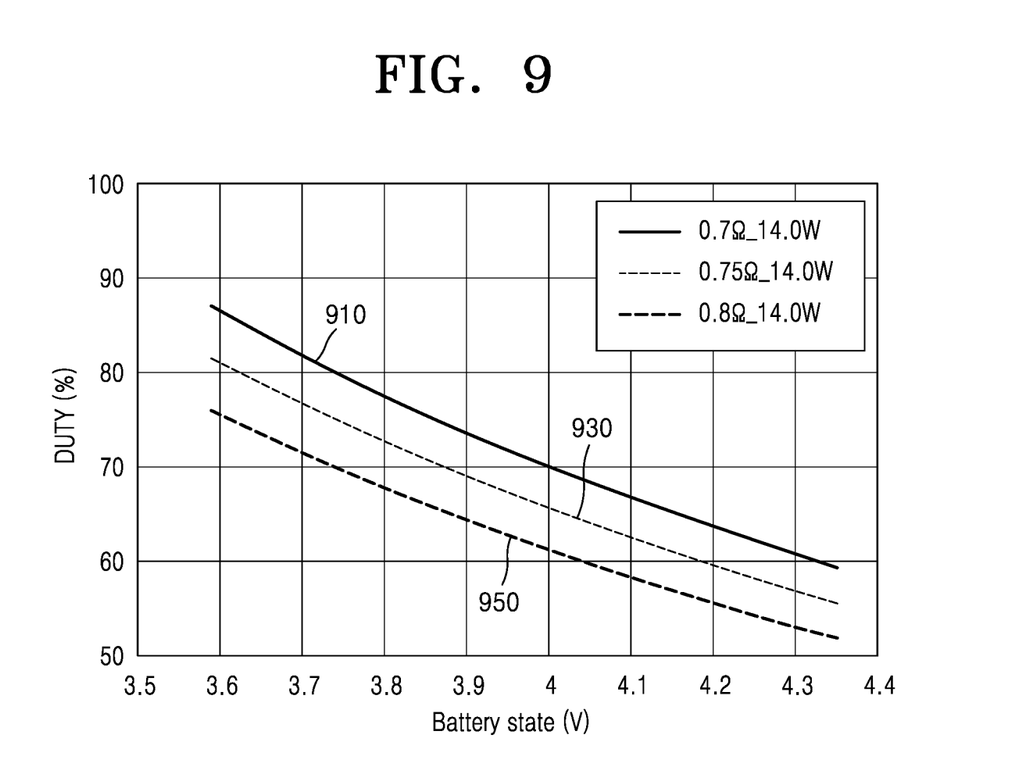
FIG. 9 is a diagram illustrating a relationship between a resistance value of a heater and a duty ratio.

FIG. 9 is a diagram illustrating a relationship between a resistance value of a heater and a duty ratio.

As shown in FIG. 9, the duty ratio of a control signal increases as the resistance value of the heater increases.

Referring to FIGS. 8 and 9, the duty ratio of the control signal may be calculated in consideration of at least one of the state information of the battery, such as the voltage level of the battery, the resistance value of the heater, and a supply power supplied to the heater, which are already described in Equations 1 to 5.

Figure 10:
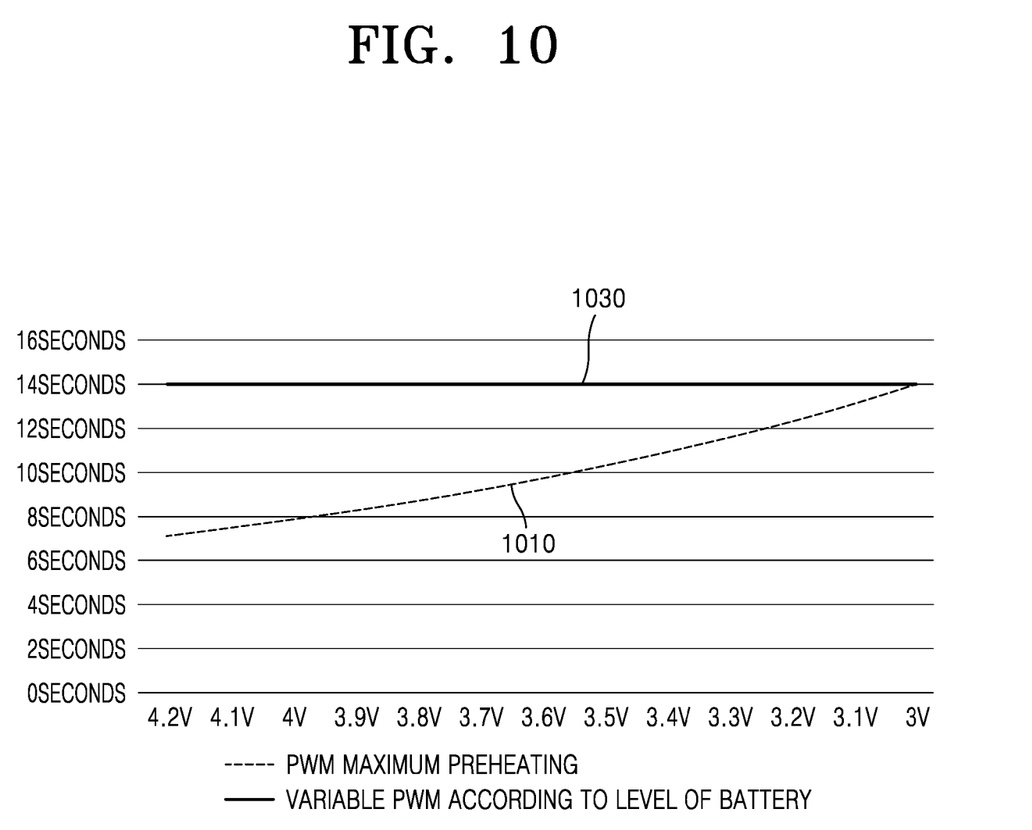
FIG. 10 is a diagram schematically illustrating a preheating time of a heater when power is supplied to the heater using a control signal having a flexible duty ratio according to state information of a battery.

FIG. 10 is a diagram schematically illustrating a preheating time of a heater when power is supplied to the heater using a control signal having a flexible duty ratio according to the state information of a battery.

First, in the related art, it is assumed that the power is supplied to the heater by the battery, having the minimum voltage level of 3V and the maximum voltage level of 4.2V, through the control signal according to the fixed duty ratio without considering the state information of the battery. According to Equation 3 described above, because the duty ratio D and the resistance $R_H$ of the heater may be regarded as a constant value, the power supplied to the heater further increases when the voltage level of the battery is high, and thus the preheating time is rapidly reduced compared to when the voltage level of the battery is relatively low. For example, according to a preheating time curve 1010 of the related art, the preheating time of the heater is only about 7 seconds when the voltage level of the battery is 4.2V, whereas the preheating time of the heater is only about 14 seconds when the voltage level of the battery is 3.0V.

Meanwhile, when the duty ratio of the control signal is calculated according to the state information (the voltage level) of the battery at the time point when the heater starts to be heated according to the present disclosure, and the power is supplied to the heater according to the control signal having the calculated duty ratio, according to a preheating time curve 1030 according to the present disclosure, the preheating time of 14 seconds is maintained regardless of the voltage level of the battery.

Figure 11:
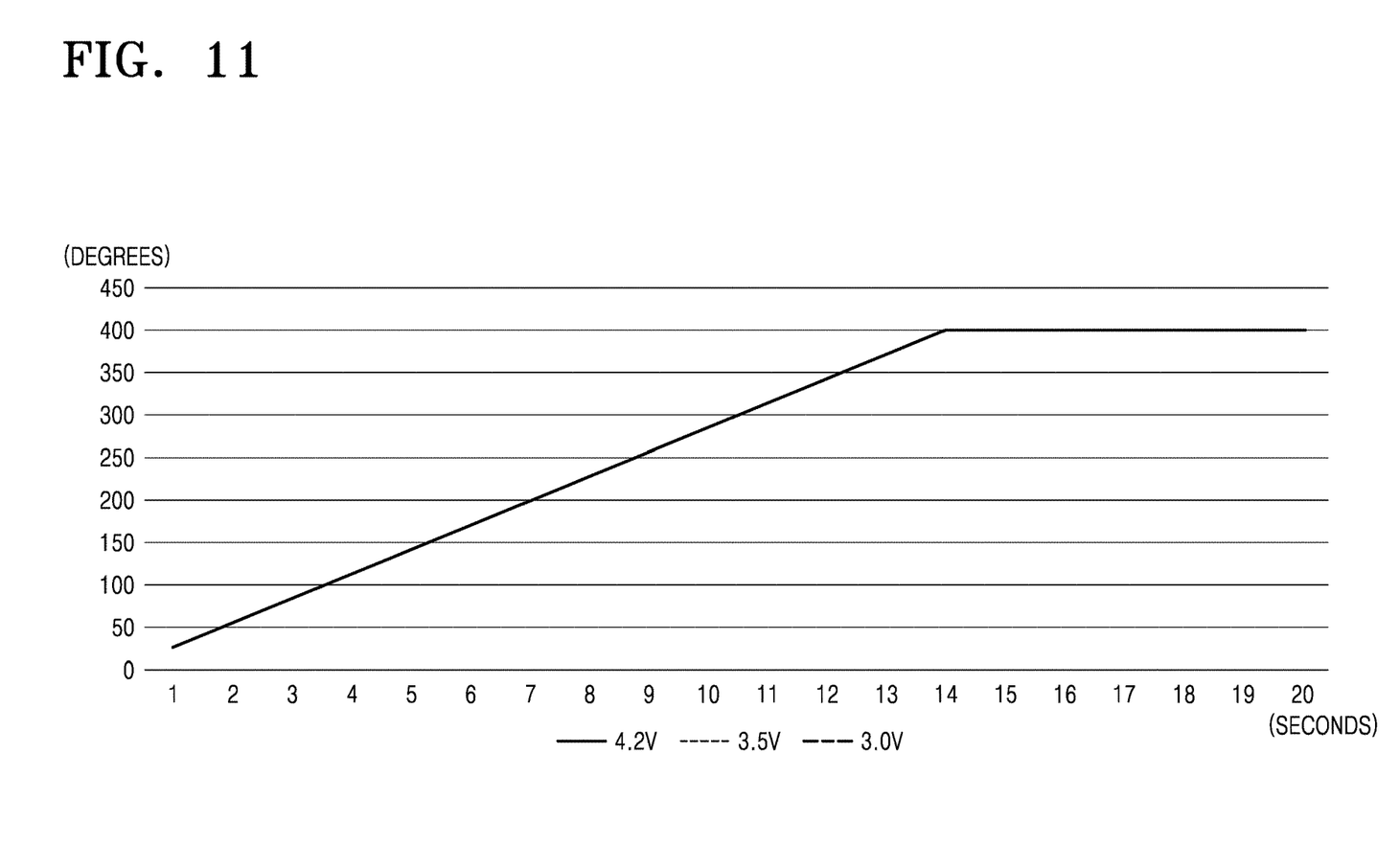
FIG. 11 is a diagram schematically illustrating a graph of an increase in the temperature of a heater when power is supplied to the heater using a control signal having a flexible duty ratio according to state information of a battery.

FIG. 11 is a diagram schematically illustrating a graph of an increase in the temperature of a heater when power is supplied to the heater using a control signal having a flexible duty ratio according to the state information of a battery.

Comparing FIG. 11 with FIG. 5, because the power is supplied to the heater using the control signal of the flexible duty ratio calculated according to the state information of the battery, the time for the heater taken to reach a target temperature is about 14 seconds which is the same when the voltage level of the battery is 4.2V, 3.5V, and 3.0V at the time point when the heater starts to be heated.

Figure 12:
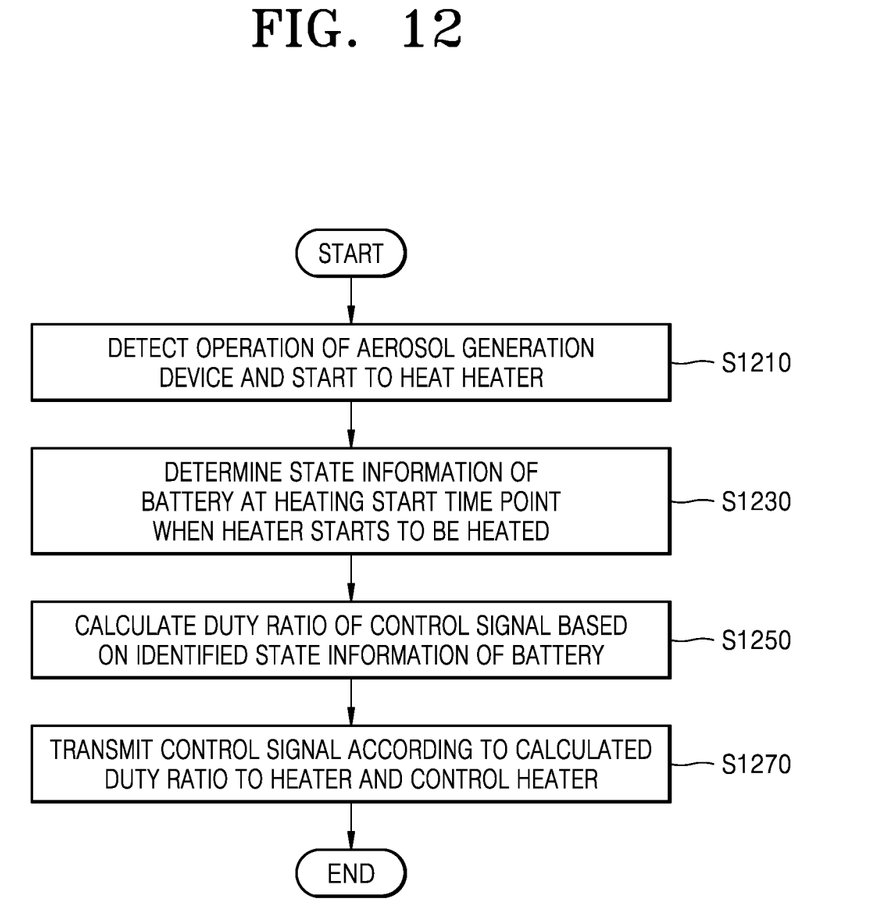
FIG. 12 is a flowchart illustrating an example of a method of controlling power supplied to a heater.

FIG. 12 is a flowchart illustrating an example of a method of controlling power supplied to a heater according to the present disclosure.

FIG. 12 may be implemented through the aerosol generation device 10 according to FIG. 6, and thus the following description will be provided with reference to FIG. 6, and redundant descriptions between FIGS. 6 and 10 will be omitted.

The controller 110 of the aerosol generation device 10 detects an operation of the aerosol generation device 10 and starts to heat the heater 130 (S1210). More specifically, the controller 110 may detect the operation of the aerosol generation device 10 in various ways. As an example, the controller 110 may recognize that a user presses an operation button provided in the aerosol generation device 10 as the operation of the aerosol generation device 10.

As another example, the controller 110 may recognize that an aerosol generating substrate is mounted on the aerosol generation device 10 as the operation of the aerosol generation device 10. In this case, the aerosol generating substrate may be a cigarette or a liquid cartridge according to a type of the aerosol generation device 10.

As an alternative embodiment of operation S1210, in order to detect the operation of the aerosol generation device 10, after the aerosol generating substrate is mounted on the aerosol generation device 10, the controller 110 may additionally determine whether aerosol generation device 10 satisfies conditions of use. The controller 110 may check whether the remaining capacity of the battery 120 exceeds a preset value and a connection state or an assembly state is normal between modules constituting the aerosol generation device 10 when the aerosol generation device is mounted on the aerosol generation device 10 to determine whether the aerosol generation device 10 satisfies the conditions of use.

Subsequently, the controller 110 determines the state information of the battery 120 at a heating start time point when the heater 130 starts to be heated (S1230). According to an embodiment, it is already described that the controller 110 may further identify the state information of the battery 120 at the time point when the voltage level of the battery 120 falls exceeding a preset range in addition to the heating start time point.

The controller 110 calculates a duty ratio of a control signal based on the state information of the battery 120 identified in operation S1230 (S1250). The duty ratio calculated in operation S1250 may vary according to a minimum value of the voltage used by the battery 120 and the voltage level of the battery 120 at the time point when the heater 130 starts to be heated according to Equation 5.

The controller 110 transmits the control signal according to the duty ratio calculated in operation S1250 to the heater 130 and controls the heater 130 to be heated (S1270). In operation S1270, the heater 130 reaches the target temperature through the same preheating time regardless of the state information (the voltage level) of the battery 120 in operation S1230, and uniform heat energy is applied to the aerosol generating substrate through the same preheating time, and thus the user may have a consistent smoking experience through the aerosol generation device 10 according to the present disclosure.

Embodiments according to the present disclosure described above may be implemented in the form of a computer program that may be executed through various elements on a computer, and such a computer program may be recorded in a computer-readable medium. In this regard, examples of the medium may include magnetic media such as a hard disk, a floppy disk, and magnetic tape, optical media such as compact disk read only memory (CD-ROM) and digital versatile disk (DVD), magneto-optical media such as a floptical disk, and a hardware device especially configured to store and execute a program command, such as read only memory (ROM), random access memory (RAM) and flash memory, etc.

Meanwhile, the computer program may be a program command specially designed and configured for the present disclosure or a program command known to be used by those of skill in the art of the computer software field. Further, examples of the program commands include machine language code created by a compiler and high-level language code executable by a computer using an interpreter.

The particular implementations shown and described in the present disclosure are illustrative examples and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical".

Herein (especially, in the claims), the use of "the" and other demonstratives similar thereto may correspond to both a singular form and a plural form. Also, when a range is described in the present disclosure, the range has to be regarded as including disclosure adopting any individual element within the range (unless described otherwise), and it has to be regarded as having written in the detailed description each individual element included in the range. Unless the order of operations of a method according to the present disclosure is explicitly mentioned or described otherwise, the operations may be performed in a proper order. The present disclosure is not limited to the order the operations are mentioned. The use of all examples or exemplary terms (e.g., "etc.,", "and (or) the like", and "and so forth") in the present disclosure is merely intended to describe the embodiment in detail, and the scope of the present disclosure is not necessarily limited by the examples or exemplary terms unless defined by the claims. Also, one of ordinary skill in the art may appreciate that the present disclosure may be configured through various modifications, combinations, and changes according to design conditions and factors without departing from the spirit and technical scope of the present disclosure and its equivalents.

INDUSTRIAL APPLICABILITY

The present disclosure may be applied to an aerosol generation device or a flavor aspirator that provides an inhalable aerosol or flavor to a user.

What is claimed is:

1. An aerosol generation device comprising:
a heater configured to generate an aerosol by heating an aerosol generating substrate; and
a controller configured to control power to be supplied to the heater by a battery using a control signal,
wherein the controller is further configured to:
identify state information of the battery at a heating start time point when the heater starts to be heated, and
calculate a duty ratio of the control signal based on the identified state information such that time taken for the heater to reach a predetermined temperature is constant regardless of a nonzero voltage value of the battery at the heating start time.

2. The aerosol generation device of claim 1,
wherein the controller is further configured to:
extract the voltage value of the battery from the state information of the battery.

3. The aerosol generation device of claim 2,
wherein the controller is further configured to:
calculate the duty ratio of the control signal based on a minimum use voltage value of the battery differently preset according to an equivalent impedance of an entire module receiving power from the battery.

4. The aerosol generation device of claim 2,
wherein the duty ratio is inversely proportional to a square of the voltage value.

5. The aerosol generation device of claim 1,
wherein the controller is further configured to:
calculate the duty ratio based on at least one of power previously supplied to the heater and a predetermined resistance value of the heater.

6. The aerosol generation device of claim 1,
wherein the controller is further configured to:
analyze the state information to estimate a remaining capacity of the battery and
calculate the duty ratio based on the estimated remaining capacity.

7. The aerosol generation device of claim 1,
further comprising:
a field effect transistor (FET) configured to perform an on-off operation according to the duty ratio of the control signal to control the power of the battery to be supplied to the heater.

8. The aerosol generation device of claim 1,
wherein the controller is further configured to:
control the power to be supplied to the heater using a control signal according to a first duty ratio at the heating start time point, and
when a change in the state information of the battery exceeds a preset range before the heater reaches a target temperature, calculate a second duty ratio at a time point of the change to control the power to be supplied to the heater using a control signal according to the calculated second duty ratio.

9. The aerosol generation device of claim 1,
wherein the control signal is a pulse width modulation (PWM) signal.

10. A method of controlling power of a battery supplied to a heater, the method comprising:
identifying state information of the battery at a heating start time point when the heater starts to be heated and
calculating a duty ratio of a control signal based on the identified state information such that time taken for the heater to reach a predetermined temperature is constant regardless of a nonzero voltage value of the battery at the heating start time.

11. The method of claim 10,
wherein the calculating of the duty ratio comprises:
extracting the voltage value of the battery from the state information of the battery.

12. The method of claim 11,
wherein the calculating of the duty ratio comprises:
calculating the duty ratio of the control signal based on a minimum use voltage value of the battery differently preset according to an equivalent impedance of an entire module receiving power from the battery.

13. The method of claim 11,
wherein the duty ratio is inversely proportional to a square of the voltage value.

14. The method of claim 10,
wherein the calculating of the duty ratio comprises:
calculating the duty ratio based on at least one of power previously supplied to the heater and a predetermined resistance value of the heater.

15. The method of claim 10,
wherein the calculating of the duty ratio comprises:
analyzing the state information to estimate a remaining capacity of the battery and
calculating the duty ratio based on the estimated remaining capacity.

16. The method of claim 10,
further comprising:
a field effect transistor (FET) performing an on-off operation according to the duty ratio of the control signal to control the power of the battery to be supplied to the heater.

17. The method of claim 10,
further comprising:
controlling power to be supplied to the heater using a control signal according to a first duty ratio at the heating start time point, and
when a change in the state information of the battery exceeds a preset range before the heater reaches a target temperature, calculating a second duty ratio at a changed time point to control the power to be supplied to the heater using a control signal according to the calculated second duty ratio.

18. The method of claim 10,
wherein the control signal is a pulse width modulation (PWM) signal.

19. A non-transitory computer-readable recording medium storing a program for implementing the method of claim 10.

* * * * *